United States Patent
Yamamoto et al.

(10) Patent No.: US 11,085,531 B2
(45) Date of Patent: Aug. 10, 2021

(54) SHIFT RANGE CONTROL DEVICE

(71) Applicant: DENSO CORPORATION, Kariya (JP)

(72) Inventors: Daisuke Yamamoto, Kariya (JP); Koji Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/838,116

(22) Filed: Apr. 2, 2020

(65) Prior Publication Data
US 2020/0224762 A1 Jul. 16, 2020

Related U.S. Application Data

(63) Continuation of application No. PCT/JP2018/037313, filed on Oct. 5, 2018.

(30) Foreign Application Priority Data

Oct. 10, 2017 (JP) .............................. JP2017-196817

(51) Int. Cl.
*F16H 61/12* (2010.01)
*F16H 61/32* (2006.01)
*H02P 6/12* (2006.01)

(52) U.S. Cl.
CPC ............. *F16H 61/12* (2013.01); *F16H 61/32* (2013.01); *H02P 6/12* (2013.01); *F16H 2061/326* (2013.01)

(58) Field of Classification Search
CPC .. F16H 61/12; F16H 61/32; F16H 2061/1208; F16H 2061/1288; F16H 2061/326; H02P 6/12
See application file for complete search history.

(56) References Cited

U.S. PATENT DOCUMENTS

| 5,699,870 A | * | 12/1997 | Warren | .................. F16H 61/32 180/247 |
| 2005/0151491 A1 | * | 7/2005 | Nakai | ..................... H02P 5/747 318/98 |
| 2009/0091866 A1 | * | 4/2009 | Inoue | ...................... F16H 61/12 361/23 |
| 2017/0248229 A1 | * | 8/2017 | Nakayama | ................ H02P 8/06 |

FOREIGN PATENT DOCUMENTS

JP 2001-271917 10/2001

* cited by examiner

*Primary Examiner* — Edwin A Young
(74) *Attorney, Agent, or Firm* — Nixon & Vanderhye P.C.

(57) ABSTRACT

A shift range control device includes a drive circuit, a voltage detector, and a controller. The drive circuit includes switching elements, and is shared by a plurality of winding sets. The voltage detector detects terminal voltages of respective phases. The controller controls energization of the winding sets by controlling on and off operations of the switching elements, and controls interruption units each capable of switching between conduction and interruption of power from a power supply to a corresponding winding set. The controller performs disconnection diagnosis based on the terminal voltage during energization of the winding sets in a control state where one of the interruption units is controlled to conduct the power and a remaining interruption unit is controlled to interrupt the power.

7 Claims, 12 Drawing Sheets

FIG. 5
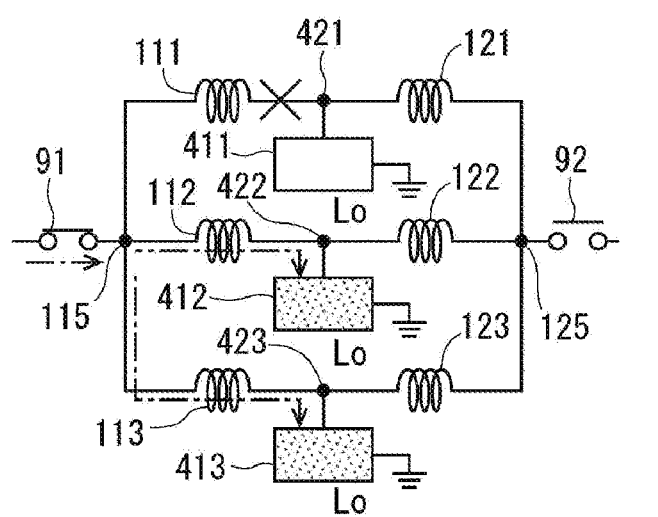
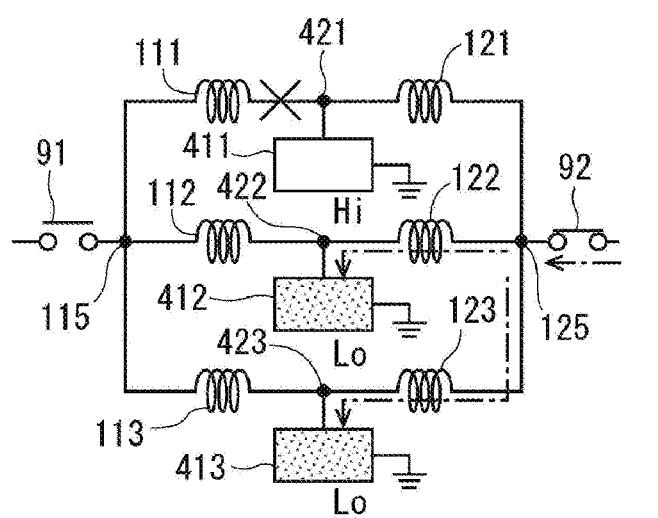

FIG. 7
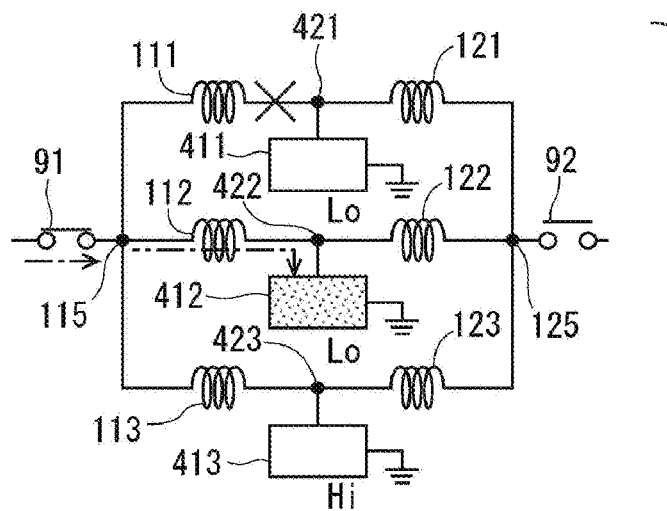
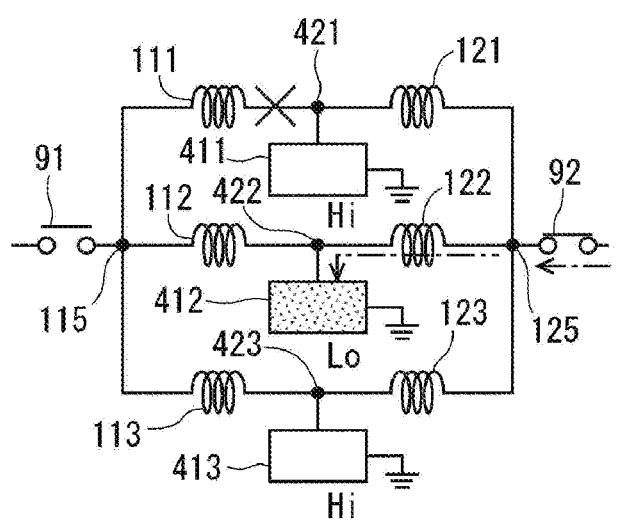

SHIFT RANGE CONTROL DEVICE

CROSS REFERENCE TO RELATED APPLICATIONS

The present application is a continuation application of International Patent Application No. PCT/JP2018/037313 filed on Oct. 5, 2018, which designated the U.S. and claims the benefit of priority from Japanese Patent Application No. 2017-196817 filed on Oct. 10, 2017. The entire disclosures of all of the above applications are incorporated herein by reference.

TECHNICAL FIELD

The present disclosure relates to a shift range control device.

BACKGROUND

A shift range switching device switches a shift range by driving an actuator such as a motor. The shift range switching device, for example, includes two winding units, and two drive circuits provided correspondingly to the two winding units.

SUMMARY

The present disclosure describes a shift range control device configured to control driving of an actuator including a plurality of winding sets for controlling a shift range switching system. The shift range control device includes a drive circuit, a voltage detector, and a controller. The drive circuit includes a plurality of switching elements, and is shared by the plurality of winding sets. The voltage detector detects terminal voltages of respective phases. The controller controls energization of the winding sets by controlling on and off operations of the switching elements, and controls interruption units, each of which is capable of switching between conduction and interruption of power from a power supply to a corresponding one of the winding sets. The controller further performs a disconnection diagnosis based on the terminal voltages that occur during energization of the winding sets in a control state where one of the interruption units is controlled to conduct the power and a remaining interruption unit is controlled to interrupt the power.

BRIEF DESCRIPTION OF DRAWINGS

The above and other objects, features and advantages of the present disclosure will become more apparent from the following detailed description made with reference to the accompanying drawings, in which:

FIG. 5 is an explanatory diagram explaining a terminal voltage at the time of U-phase disconnection caused during the two-phase energization according to the one embodiment;

FIG. 7 is an explanatory diagram explaining a terminal voltage at the time of U-phase disconnection caused during the one-phase energization according to the one embodiment;

DESCRIPTION OF EMBODIMENTS

A shift range switching device, which switches a shift range by driving an actuator such as a motor, may include two winding units, and two drive circuits provided correspondingly to the two winding units. In a case where the drive circuit is provided for each winding unit, an abnormality such as a disconnection is detectable based on a detection signal generated from a current detection circuit provided in each energization path from the drive circuit to a corresponding phase of the winding unit. However, it is conceivable to share one drive circuit by a plurality of winding sets for simplification of a configuration.

The present disclosure provides a shift range control device capable of appropriately detecting a disconnection abnormality.

According to an aspect of the present disclosure, a shift range control device is configured to control driving of an actuator including a plurality of winding sets for controlling a shift range switching system. The shift range control device includes a drive circuit, a voltage detector, and a controller. The drive circuit includes a plurality of switching elements, and is shared by the plurality of winding sets. The voltage detector detects terminal voltages of respective phases. The controller includes an energization control section, an interruption unit control section, and an abnormality monitoring section. The energization control section controls energization of the winding sets by controlling on and off operations of the switching elements. The interruption unit control section controls interruption units, each of which is capable of switching between conduction and interruption of power from a power supply to a corresponding one of the winding sets. The abnormality monitoring section monitors an abnormality of the shift range switching system.

The abnormality monitoring section performs a disconnection diagnosis based on the terminal voltages that occur during energization of the winding sets in a control state where one of the interruption units is controlled to conduct the power and a remaining interruption unit is controlled to interrupt the power.

In such a configuration, a disconnection abnormality can be appropriately detected even when the drive circuit is shared by the winding sets of the plurality of systems for simplification of the configuration.

Embodiment

Figure 1:
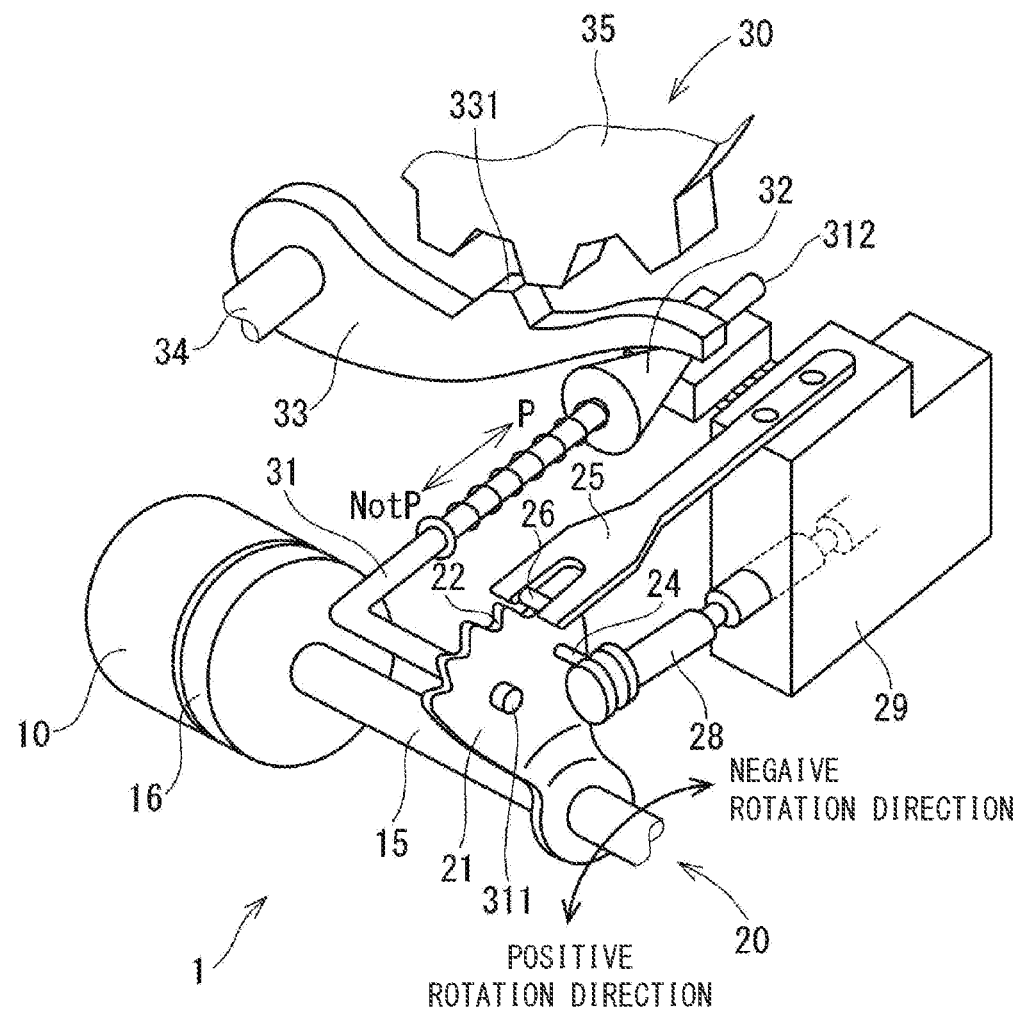
FIG. 1 is a perspective view showing a shift-by-wire system according to one embodiment.
Figure 2:
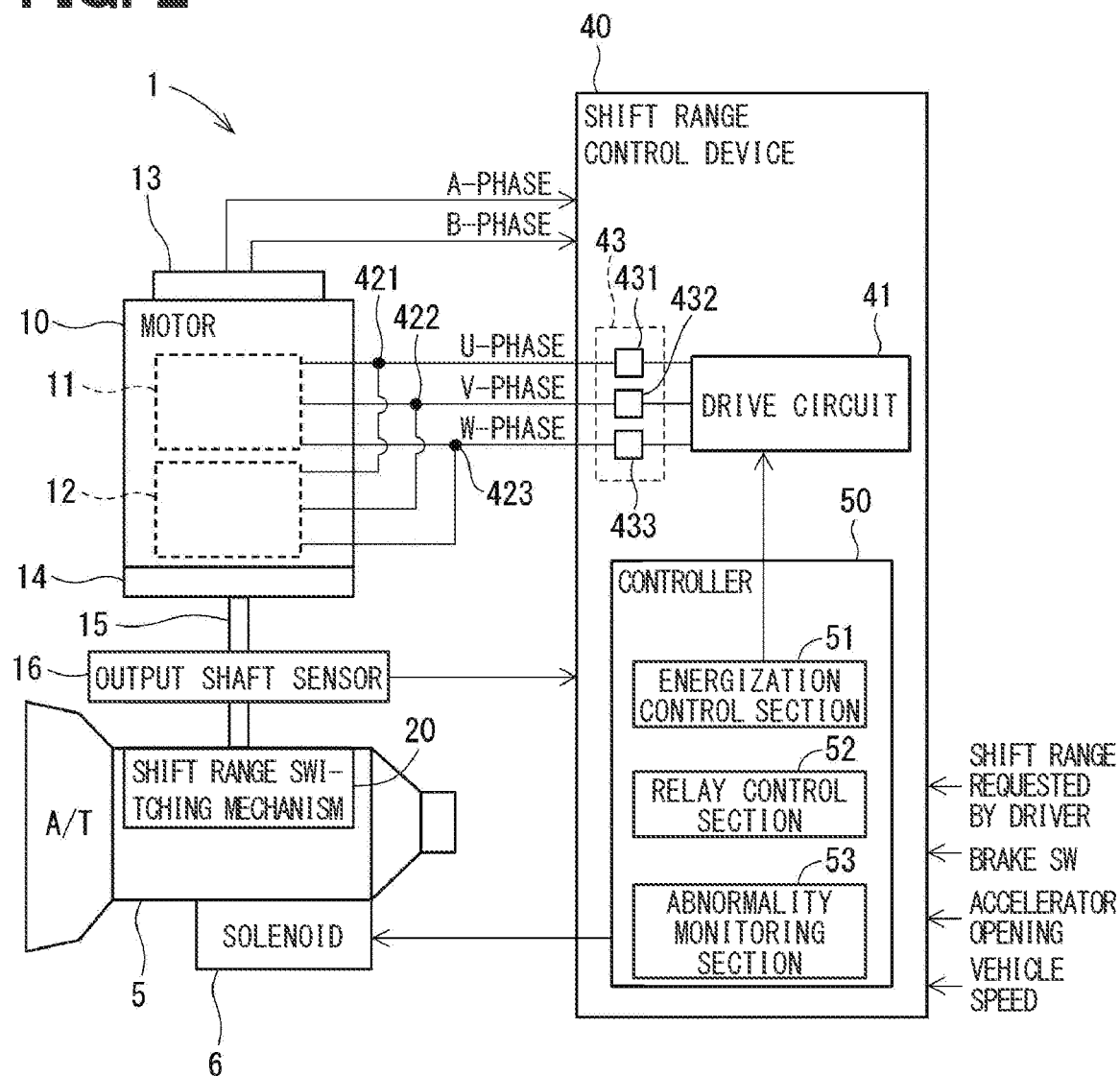
FIG. 2 is a schematic configuration diagram showing the shift-by-wire system according to the one embodiment.
Figure 3:
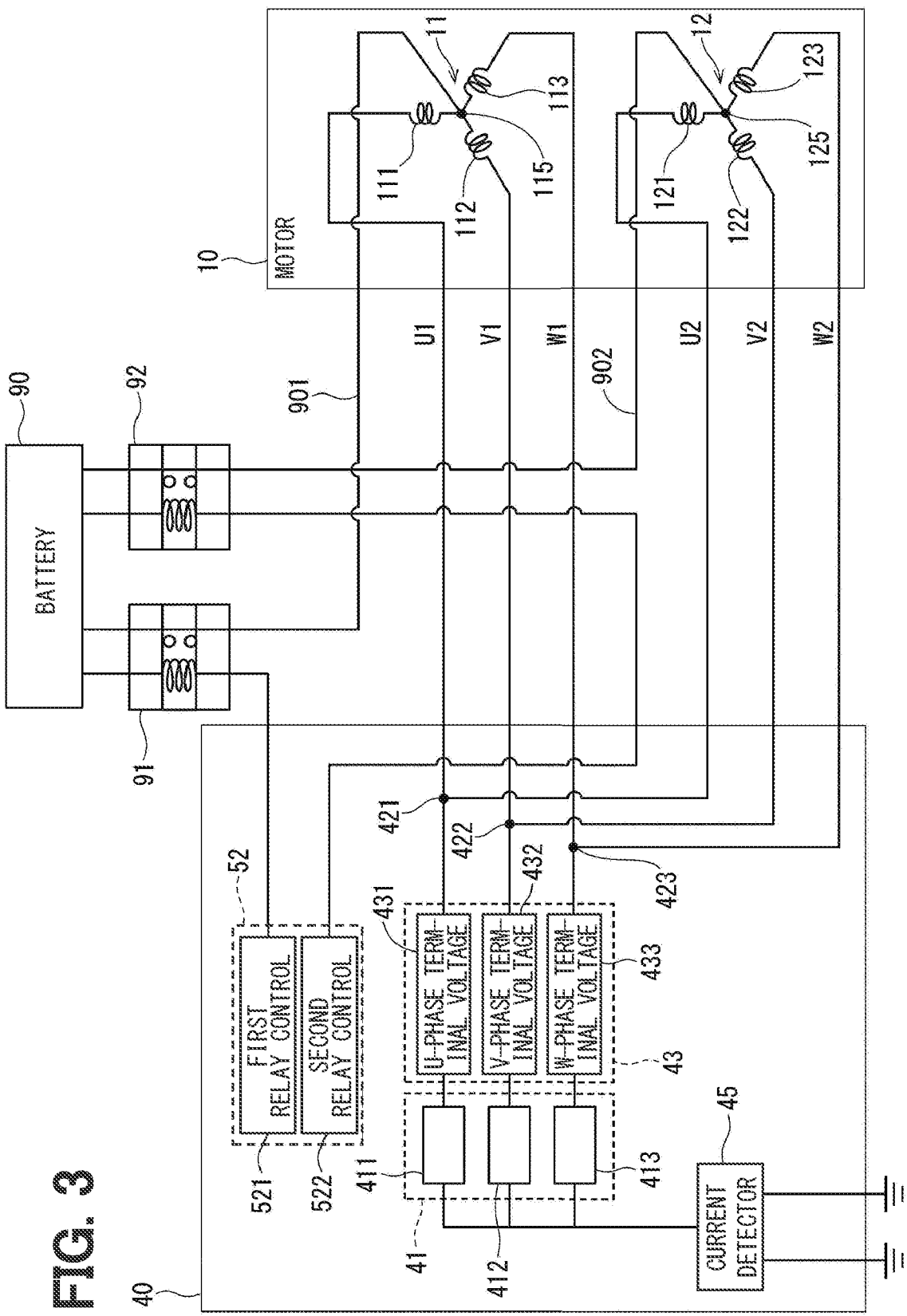
FIG. 3 is a circuit diagram explaining a motor circuit configuration of the shift-by-wire system according to the one embodiment.

A shift range control device will be hereinafter described with reference to the drawings. FIGS. 1 to 13 each show a shift range control device according to one embodiment. As shown in FIGS. 1 to 3, a shift-by-wire system 1 functioning as a shift range switching system includes a motor 10 functioning as an actuator, a shift range switching mechanism 20, a parking lock mechanism 30, a shift range control device 40, and others.

The motor 10 rotates when receiving electric power from a battery 90, which is mounted on a vehicle (not shown) as a power supply, and serves as a drive source of the shift range switching mechanism 20. The motor 10 is capable of changing current intensity by feedback control, and capable of changing a command for each phase. The motor 10 of the present embodiment is an SR (switched reluctance) motor. As shown in FIG. 3, the motor 10 includes two winding sets 11 and 12. The first winding set 11 has a U-phase winding 111, a V-phase winding 112, and a W-phase winding 113. The second winding set 12 has a U-phase winding 121, a V-phase winding 122, and a W-phase winding 123.

As shown in FIG. 2, an encoder 13 functioning as a rotation angle sensor detects a rotational position of a rotor (not shown) of the motor 10. For example, the encoder 13 is a magnetic rotary encoder, and includes a magnet which rotates with the rotor as one body, a Hall integrated circuit (IC) for detecting a magnetic field, and the like. The encoder 13 outputs pulse signals of A phase and B phase at predetermined angular intervals in synchronization with rotation of the rotor.

A speed reducer 14 is provided between a motor shaft of the motor 10 and an output shaft 15 to reduce a rotation speed of the motor 10 and output the rotation to the output shaft 15. In this manner, the rotation of the motor 10 is transmitted to the shift range switching mechanism 20. The output shaft 15 is provided with an output shaft sensor 16 for detecting an angle of the output shaft 15. The output shaft sensor 16 of the present embodiment has four switches each turned on in a rotation angle range of corresponding one of P, R, N, and D ranges. The current range is detectable by determining which switch of the output shaft sensor 16 has been turned on. Accordingly, the output shaft sensor 16 is also considered as a transmission range sensor. The output shaft sensor 16 may be constituted by a potentiometer or the like instead of the switches corresponding to the respective ranges.

As shown in FIG. 1, the shift range switching mechanism 20 includes a detent plate 21, a detent spring 25, and the like. The shift range switching mechanism 20 transmits a rotational driving force output from the speed reducer 14 to a manual valve 28 and the parking lock mechanism 30.

The detent plate 21 is fixed to the output shaft 15 and driven by the motor 10. In the present embodiment, a direction in which the detent plate 21 moves away from a base portion of the detent spring 25 is defined as a positive rotation direction, and a direction in which the detent plate 21 moves toward the base portion is defined as a negative rotation direction. The detent plate 21 includes a pin 24 projecting in parallel with the output shaft 15. The pin 24 is connected to the manual valve 28. When the detent plate 21 is driven by the motor 10, the manual valve 28 reciprocates in an axial direction. More specifically, the shift range switching mechanism 20 converts rotational movement of the motor 10 into linear movement, and transmits the linear movement to the manual valve 28. The manual valve 28 is included in a valve body 29. When the manual valve 28 reciprocates in the axial direction, a hydraulic pressure supply path to a hydraulic clutch (not shown) is switched to change an engagement state of the hydraulic clutch. In this manner, switching of the shift range is achieved.

Four recesses 22 each holding the manual valve 28 in a position corresponding to an associated range are formed in the detent plate 21 on the detent spring 25 side. The recesses 22 are formed corresponding to ranges of D, N, R, and P from the base portion side of the detent spring 25, respectively.

The detent spring 25 is an elastically deformable plate-shaped member. A detent roller 26 is provided at a tip of the detent spring 25. The detent roller 26 is fitted to one of the recesses 22. The detent spring 25 urges the detent roller 26 toward the rotation center of the detent plate 21. When a rotational force equal to or larger than a predetermined force is applied to the detent plate 21, the detent spring 25 is elastically deformed. As a result, the detent roller 26 moves along the recesses 22. When the detent roller 26 is fitted to any of the recesses 22, swing of the detent plate 21 is regulated. Accordingly, the axial position of the manual valve 28 and the state of the parking lock mechanism 30 are determined to fix a shift range of an automatic transmission 5.

The parking lock mechanism 30 includes a parking rod 31, a cone 32, a parking lock pole 33, a shaft portion 34, and a parking gear 35. The parking rod 31 has a substantially L shape. One end 311 of the parking rod 31 is fixed to the detent plate 21. The cone 32 is provided at an opposite end 312 of the parking rod 31. The cone 32 has a diameter which decreases toward the opposite end 312. When the detent plate 21 swings in the negative rotation direction, the cone 32 moves in a direction of an arrow P.

The parking lock pole 33 abuts a conical surface of the cone 32 and swings around the shaft portion 34. The parking lock pole 33 includes a protrusion 331 engageable with the parking gear 35 and located at the parking lock pole 33 on the parking gear 35 side. When the cone 32 moves in the direction of the arrow P by rotation of the detent plate 21 in the negative rotation direction, the parking lock pole 33 is pushed up to achieve engagement between the protrusion 331 and the parking gear 35. On the other hand, when the cone 32 moves in a direction of an arrow NotP by rotation of the detent plate 21 in the positive rotation direction, the engagement between the protrusion 331 and the parking gear 35 is released.

The parking gear 35 is provided on an axle (not shown) in such a manner as to be engageable with the protrusion 331 of the parking lock pole 33. Rotations of the axle are regulated during engagement between the parking gear 35 and the protrusion 331. At the time of a shift range other than P range, i.e., non-P range, the parking gear 35 is not locked by the parking lock pole 33. In this condition, rotations of the axle are not regulated by the parking lock mechanism 30. During the shift range of P range, the parking gear 35 is locked by the parking lock pole 33. In this condition, rotations of the axle are regulated.

As shown in FIGS. 2 and 3, the shift range control device 40 includes a drive circuit 41, a voltage detector 43, a current detector 45, a controller 50, and the like. The drive circuit 41 has three switching elements 411, 412, and 413. In the present embodiment, the switching elements 411 to 413 are metal-oxide silicon field-effect transmitters (MOSFETs). In place of the MOSFETs, the switching elements 411 to 413 may be provided by insulated gate bipolar transistors (IGBTs) or the like.

The U-phase switching element 411 is provided between a connecting portion 421 at which the U-phase windings 111 and 121 are connected, and the ground. The V-phase switching element 412 is provided between a connecting portion 422 at which the V-phase windings 112 and 122 are connected, and the ground. The W-phase switching element 413 is provided between a connecting portion 423 at which the W-phase windings 113 and 123 are connected, and the ground.

The windings 111 to 113 of the first winding set 11 are connected to each other at a wiring connection portion 115. Power is supplied from the battery 90 to the wiring connection portion 115 via a first power supply line 901. A first relay unit 91 is provided on the first power supply line 901. Power is supplied to the wiring connection portion 115 while the first relay unit 91 is in an on state.

The windings 121 to 123 of the second winding set 12 are connected to each other at a wiring connection portion 125. Power is supplied from the battery 90 to the wiring connection portion 125 via a second power supply line 902. A second relay unit 92 is provided on the second power supply line 902. Power is supplied to the wiring connection portion 125 while the second relay unit 92 is in an on state.

In the present embodiment, each of the relay units 91 and 92 corresponds to an "interruption unit". In the following description, where appropriate, a group of the first power supply line 901, the first relay unit 91, and the first winding set 11 is referred to as a first system, and a group of the second power supply line 902, the second relay unit 92, and the second winding set 12 is referred to as a second system.

The voltage detector 43 includes a U-phase terminal voltage detection section 431, a V-phase terminal voltage detection section 432, and a W-phase terminal voltage detection section 433. The U-phase terminal voltage detection section 431 is provided between the connecting portion 421 of the U-phase windings 111 and 121 and the U-phase switching element 411. The V-phase terminal voltage detection section 432 is provided between the connecting portion 422 of the V-phase windings 112 and 122 and the V-phase switching element 412. The W-phase terminal voltage detection section 433 is provided between the connecting portion 423 of the W-phase windings 113 and 123 and the W-phase switching element 413. In the following description, a value detected by the U-phase terminal voltage detection section 431 is referred to as a U-phase terminal voltage Vu, a value detected by the V-phase terminal voltage detection section 432 is referred to as a V-phase terminal voltage Vv, and a value detected by the W-phase terminal voltage detection section 433 is referred to as a W-phase terminal voltage Vw.

The controller 50 includes an energization control section 51, a relay control section 52 as an interruption unit control section, and an abnormality monitoring section 53. The energization control section 51 controls energization of the winding sets 11 and 12 by controlling on and off operations of the switching elements 411 to 413 of the drive circuit 41. In this manner, driving of the motor 10 is controlled. The relay control section 52 has a first relay control section 521 and a second relay control section 522, and controls on and off operations of the relay units 91 and 92. More specifically, on and off operations of the first relay unit 91 are controlled based on a signal from the first relay control section 521, while on and off operations of the second relay unit 92 are controlled based on a signal from the second relay control section 522. The abnormality monitoring section 53 detects an abnormality of the shift-by-wire system 1.

Disconnection diagnosis performed by the abnormality monitoring section 53 will be described. In the present embodiment, the winding sets 11 and 12 are provided by two systems, while the drive circuit 41 is provided by one system. Accordingly, the winding sets 11 and 12 of a plurality of systems are connected to the drive circuit 41 of one system. In other words, the one drive circuit 41 is shared by the winding sets 11 and 12 of a plurality of systems. In this case, even if a phase in one of the systems is disconnected, power is supplied from the other system via the connecting portions 421 to 423. Accordingly, a disconnection abnormality is difficult to detect in this state based on the terminal voltages Vu, Vv, and Vw.

In the present embodiment, therefore, a circuit configuration is provided in such a manner that the power supply lines 901 and 902 are connected to the wiring connection portions 115 and 125 of the winding sets 11 and 12 of the respective systems, and power is supplied to each of the systems by controlling the relay units 91 and 92 provided on the power supply lines 901 and 902. In this case, a disconnection abnormality can be detected, as well as a disconnection portion can be specified. The disconnection abnormality herein is not limited to a disconnection of harness or winding itself, but includes an abnormality such as separation of a connector or the like which causes a conduction failure, for example.

Figure 4:
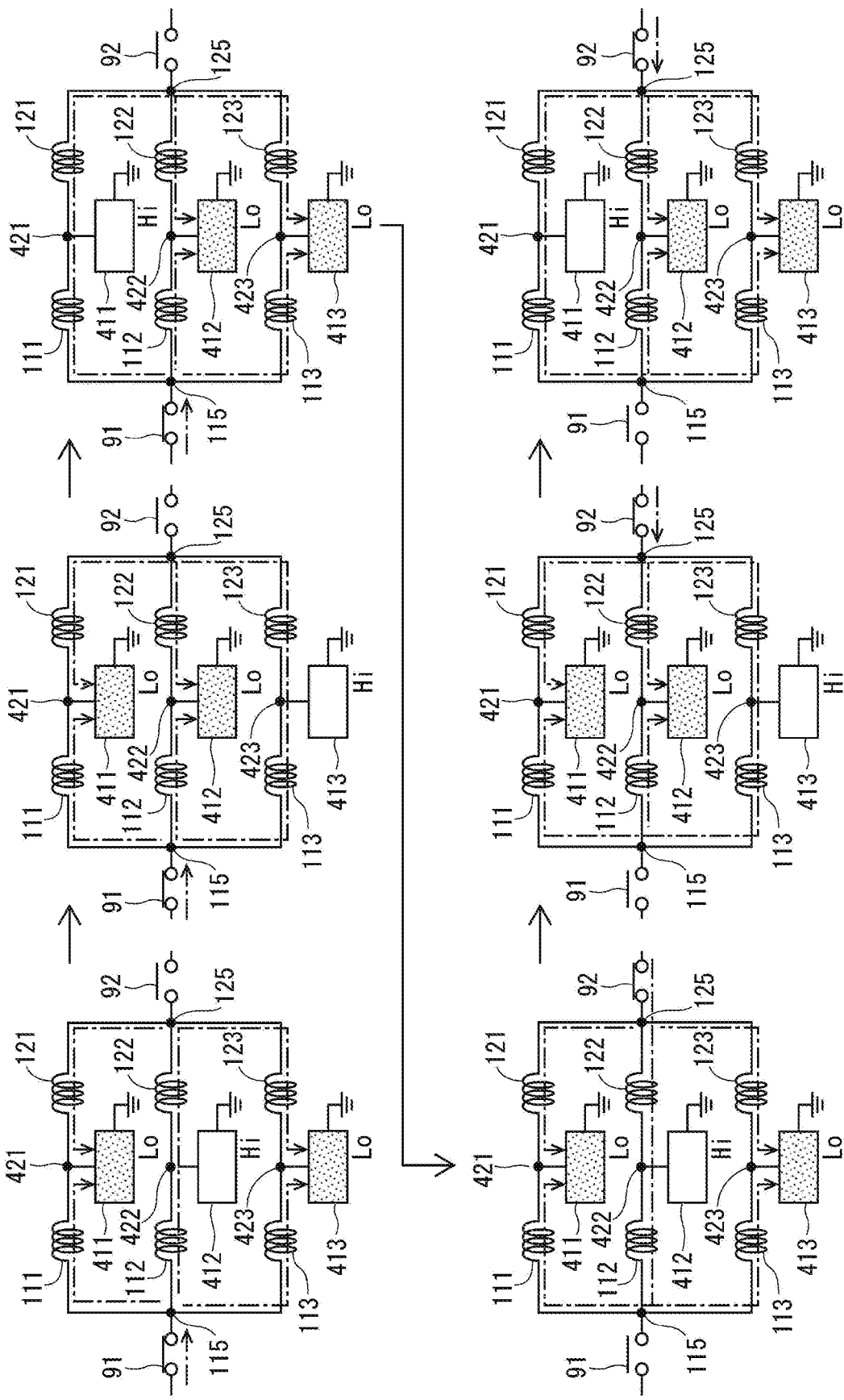
FIG. 4 is an explanatory diagram explaining an abnormality diagnosis process achieved by two-phase energization according to the one embodiment.

A disconnection diagnosis method will be described with reference to FIGS. 4 to 7. In FIGS. 4 to 7, the switching elements 411 to 413 which are turned on are indicated by matte patterns, while current paths are indicated by one-dot chain arrows. In FIG. 5 and FIG. 7, a portion where a disconnection has occurred is indicated by an "x" mark. FIGS. 4 and 5 each explain a disconnection diagnosis by two-phase energization, while FIGS. 6 and 7 each explain a disconnection diagnosis by one-phase energization.

In the disconnection diagnosis by two-phase energization, initially, the first relay unit 91 is turned on, and the second relay unit 92 is turned off. In this state, energized phases are switched at a predetermined time interval as shown in an upper part of FIG. 4. Subsequently, as shown in a lower part of FIG. 4, the first relay unit 91 is turned off, and the second relay unit 92 is turned on. In this state, the energized phases are switched at a predetermined time interval. The predetermined time interval is set to a time interval sufficient for detecting a voltage after switching on and off of the switching elements 411 to 413. In the example of FIG. 4, the energized phases are switched in the order of the W and U phases, the U and V phases, and the V and W phases in a state where one of the relay units 91 and 92 is turned on. The order of the relay units 91 and 92 to be turned on, and the order of switching of the energized phases may be different orders. The same applies to the disconnection diagnosis by one-phase energization. The switching elements 411 to 413 are provided on the ground side. When the switching elements 411 to 413 are turned on, the terminal voltages Vu, Vv, and Vw are each substantially at the ground potential. In the present embodiment, each of states where the terminal voltages Vu, Vv, and Vw are equal to or lower than a voltage determination threshold Vth, which is a reference for determining the ground potential, is referred to as Lo, and each of states where the terminal voltages Vu, Vv, and Vw are higher than the voltage determination threshold Vth is referred to as Hi.

In the absence of disconnection abnormality, the U-phase terminal voltage Vu and the W-phase terminal voltage Vw are each Lo, while the V-phase terminal voltage Vv is Hi when the switching elements 411 and 413 are turned on. When the switching elements 411 and 412 are turned on, the U-phase terminal voltage Vu and the V-phase terminal voltage Vv are each Lo, and the W-phase terminal voltage Vw is Hi. When the switching elements 412 and 413 are turned on, the V-phase terminal voltage Vv and the W-phase terminal voltage Vw are each Lo, and the U-phase terminal voltage Vu is Hi.

As shown in an upper part of FIG. 5, in the presence of a disconnection in the U phase on the first system side, when the first relay unit 91 is turned on and the V and W phases are energized, the U phase terminal voltage Vu is Lo. Thus, the terminal voltages Vu, Vv, and Vw of all the systems are Lo. As such, a disconnection abnormality can be detected. As shown in a lower part of FIG. 5, when the second relay unit 92 is turned on and the V and W phases are energized, voltage is supplied from the second relay unit 92 side even in the presence of a disconnection in the U phase of the first system. In this case, the U-phase terminal voltage Vu is Hi. As such, an abnormality is difficult to detect. Namely, it is possible to determine that the first system has a disconnection abnormality, if all the terminal voltages Vu, Vv, and Vw are Lo when the energized phases are switched in a state where the first relay unit 91 is in the on state and the second relay unit 92 is in the off state. Likewise, it is possible to determine that the second system has a disconnection abnormality, if all the terminal voltages Vu, Vv, and Vw are Lo when the energized phases are switched in a state where the first relay unit 91 is in the off state and the second relay unit 92 is in the on state.

Figure 6:
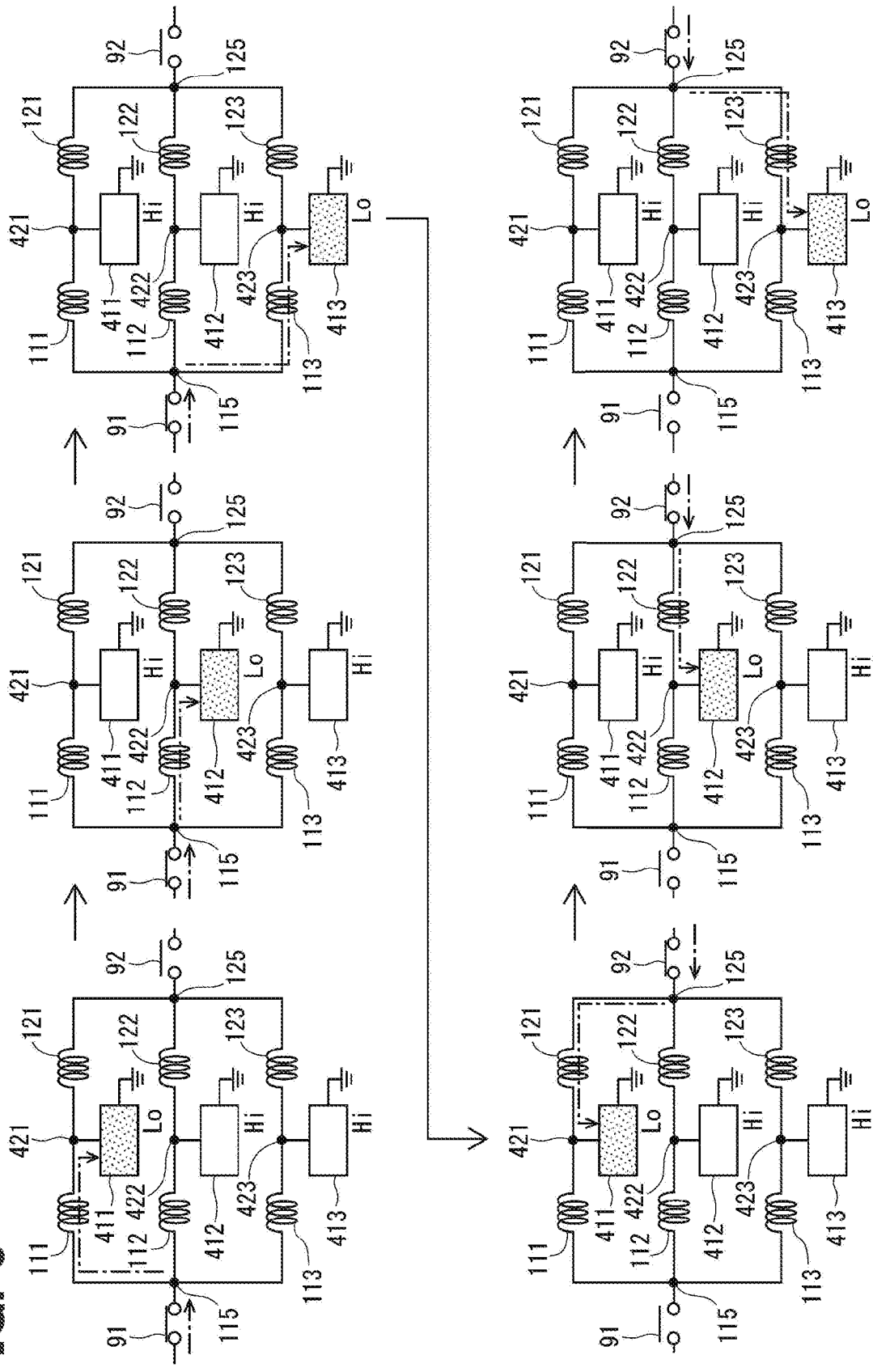
FIG. 6 is an explanatory diagram explaining an abnormality diagnosis process achieved by one-phase energization according to the one embodiment.

In the disconnection diagnosis by one-phase energization, as shown in an upper part of FIG. 6, initially, the first relay unit 91 is turned on, and the second relay unit 92 is turned off. In this state, the energized phase is switched at a predetermined time interval. As shown in a lower part of FIG. 6, the first relay unit 91 is turned off, and the second relay unit 92 is turned on. In this state, the energized phase is switched at a predetermined time interval. In the example of FIG. 6, the energized phase is switched in the order of the U phase, the V phase, and the W phase.

In the absence of disconnection abnormality, when the switching element 411 is turned on, the U-phase terminal voltage Vu is Lo, and the V-phase terminal voltage Vv and W-phase terminal voltage Vw are each Hi. When the switching element 412 is turned on, the V-phase terminal voltage Vv is Lo, and the U-phase terminal voltage Vu and the W-phase terminal voltage Vw are each Hi. When the switching element 413 is turned on, the W-phase terminal voltage Vw is Lo, and the U-phase terminal voltage Vu and the V-phase terminal voltage Vv are each Hi.

As shown in an upper part of FIG. 7, in the presence of a disconnection in the U phase on the first system side, when the first relay unit 91 is turned on and the V phase is energized, the U phase terminal voltage is Lo. Thus, an abnormality can be detected. As shown in a lower part of FIG. 7, when the second relay unit 92 is turned on and the V phase is energized, voltage is supplied from the second relay unit 92 side even in the presence of a disconnection in the U phase of the first system. In this case, the U-phase terminal voltage Vu is Hi. Thus, an abnormality is difficult to detect.

Accordingly, in a state where one of the relay units 91 and 92 is in an on state, the terminal voltage of the disconnected phase of the system in which the relay unit is in the on state is Lo when the switching element is in an off state. In this case, therefore, the disconnection portion can be specified. Specifically, suppose that the first relay unit 91 is in the on state, the second relay unit 92 is in the off state, the switching element 411 is in the off state, and at least one of the switching elements 412 and 413 is in the on state. In this situation, when the U-phase terminal voltage Vu is at a voltage determination threshold Vth or lower, it is specified that a disconnection abnormality has occurred in the U phase on the first system side, that is, on a path from the wiring connection portion 115 to the connecting portion 421.

Suppose that the first relay unit 91 is in the off state, the second relay unit 92 is in the on state, the switching element 411 is in the off state, and at least one of the switching elements 412 and 413 is in the on state. In this situation, when the U-phase terminal voltage Vu is at the voltage determination threshold Vth or lower, it is specified that a disconnection abnormality has occurred in the U phase on the second system side, that is, on a path from the wiring connection portion 125 to the connecting portion 421. A disconnection abnormality can be similarly specified for the V phase and the W phase.

In the disconnection detection by the one-phase energization, disconnections of the V-phase and the W-phase can be detected when the U-phase is energized. Disconnections of the U-phase and the W-phase can be detected when the V-phase is energized. Disconnections of the U-phase and the V-phase can be detected when the W-phase is energized. Accordingly, in the disconnection detection when the first relay unit 91 is in the on state, energization of any two of the three phases is only required, and energization to the remaining one phase may be omitted. The same applies to disconnection detection when the second relay unit 92 is in the on state. The detection time can be reduced by performing the disconnection detection by the one-phase energization. On the other hand, an erroneous determination due to noise or the like can be reduced by performing the disconnection detection by the two-phase energization.

Figure 8:
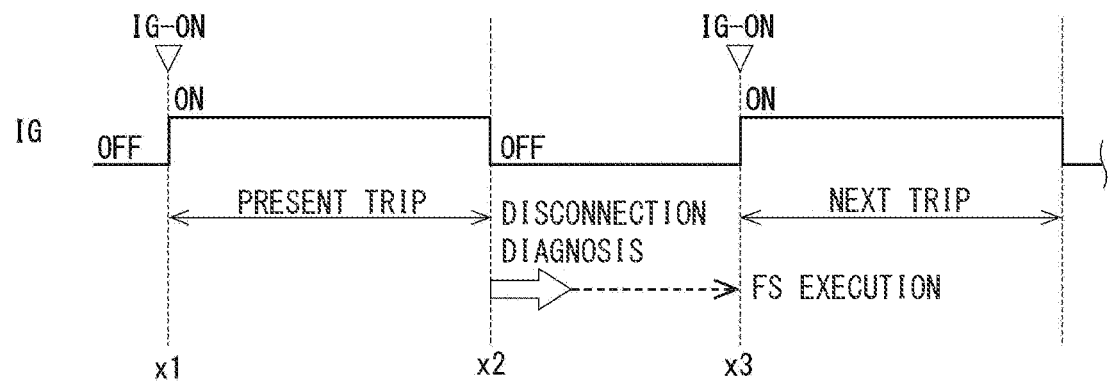
FIG. 8 is a time chart explaining timing of disconnection diagnosis after an ignition switch (IG) is turned off according to the one embodiment.
Figure 9:
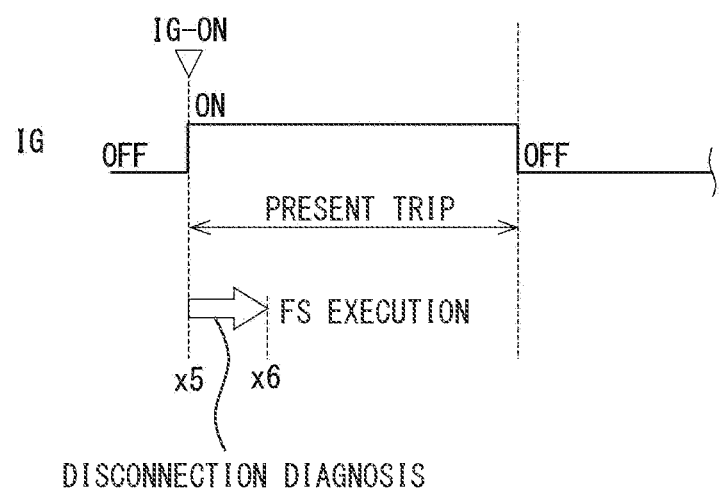
FIG. 9 is a time chart explaining the timing of disconnection diagnosis after the IG is turned on according to the one embodiment.

FIGS. 8 and 9 each show the time to execute the disconnection diagnosis. As shown in FIG. 8, the disconnection diagnosis is not performed during a present trip from turning-on of an ignition switch (hereinafter referred to as "IG") of a vehicle at a time x1 to turning-off of the IG at a time x2. When the IG is turned off at the time x2, the disconnection diagnosis is performed in a period before a shutdown of the system. When a disconnection abnormality is detected, execution of a failsafe measure is allowed immediately after a time x3 at which the next IG is turned on. Since the disconnection diagnosis is performed in the period where the IG is off, a rapid shift to a shift range switchable state is achievable in the next trip.

As shown in FIG. 9, the disconnection diagnosis is performed in an initial check before execution of the shift range switching when the IG is turned on at a time x5. When a disconnection abnormality is detected, execution of a failsafe measures is allowed in the present trip from a time x6 after completion of the disconnection diagnosis. In the on-state of the IG, execution of the disconnection diagnosis is allowed at any timing while shift range switching is not performed. In the example described above, the IG is the start switch of the vehicle. Alternatively, the IG may be a power switch or the like in a hybrid vehicle, for example. The disconnection diagnosis performed after the IG is turned off, and the disconnection diagnosis performed in the on-state of the IG may be both performed. FIGS. 8 and 9 each show a case where a disconnection abnormality is detected by way of example. In these figures, the failsafe measure is indicated as "FS".

Figure 10:
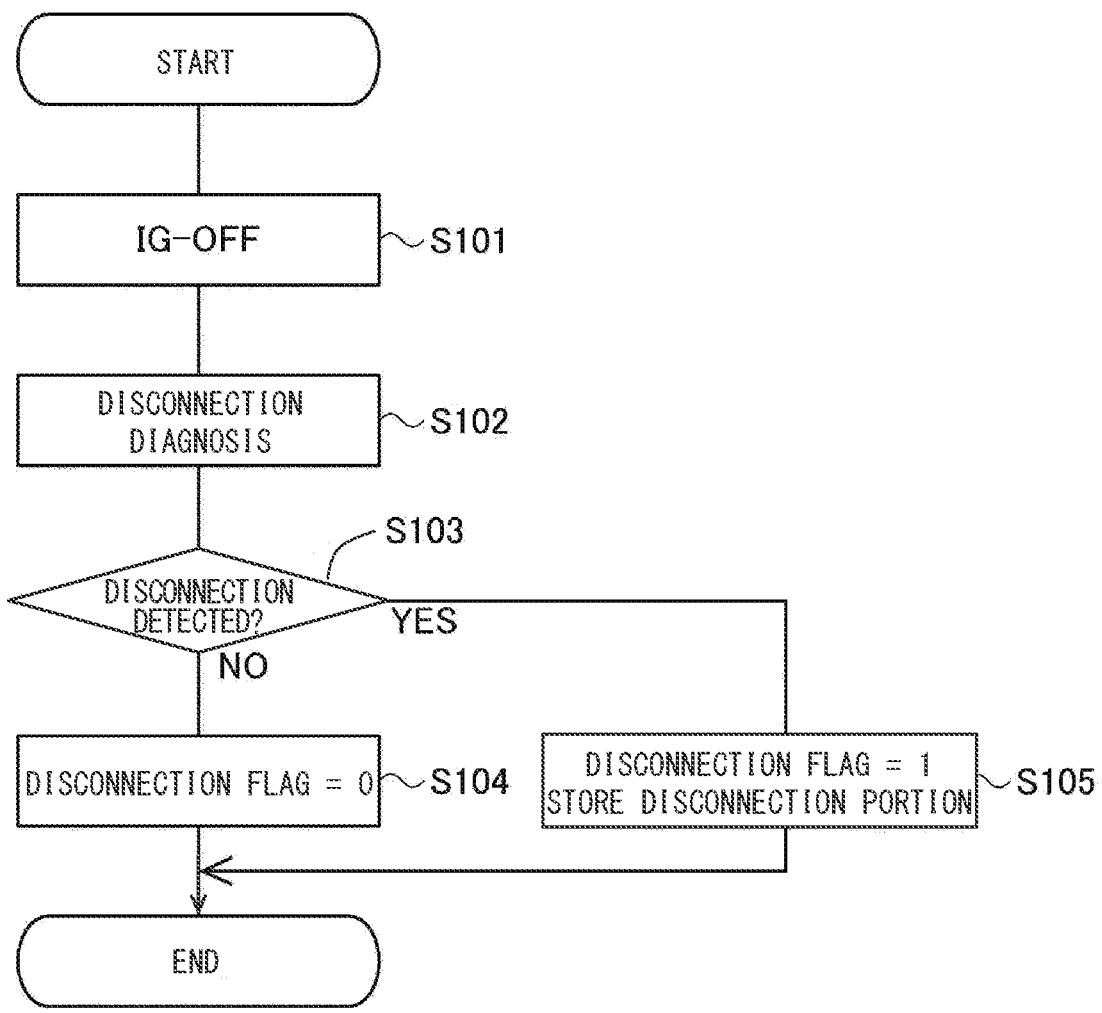
FIG. 10 is a flowchart explaining a disconnection diagnosis process performed after the IG is turned off according to the one embodiment.

A disconnection diagnosis process performed after the IG is turned off will be described with reference to a flowchart of FIG. 10. This process is a process executed when the IG is turned off. Step S101 is hereinafter simply expressed as S101, using only a symbol "S" without "step". The same applies to the other steps.

When the IG is turned off in S101, the disconnection diagnosis is performed in S102. In the disconnection diagnosis, one of the relay units 91 and 92 is turned on, and the energized phase(s) are switched in a mode of the two-phase energization or the one-phase energization. The abnormality monitoring section 53 acquires the terminal voltages Vu, Vv, and Vw to detect a disconnection abnormality and specify a disconnection portion.

In S103, the abnormality monitoring section 53 determines whether or not a disconnection abnormality has been detected. When it is determined that the disconnection abnormality has not been detected (S103: NO), the process proceeds to S104. When it is determined that the disconnection abnormality has been detected (S103: YES), the process proceeds to S105.

In S104, the abnormality monitoring section 53 resets a disconnection flag.

In S105, the abnormality monitoring section 53 sets the disconnection flag and stores abnormality information including the specified disconnection portion. The disconnection flag is a flag indicating that a disconnection abnormality has occurred. In the following description, the state where the flag is set is referred to as "1", and the state where the flag is not set is referred to as "0" where appropriate. The presence or absence of the disconnection abnormality may be retained as information other than the flag. The disconnection flag and the abnormality information are stored in a storage unit such as a static random access memory (SRAM) (not shown), which retains stored items even in the off-state of the IG.

Figure 11:
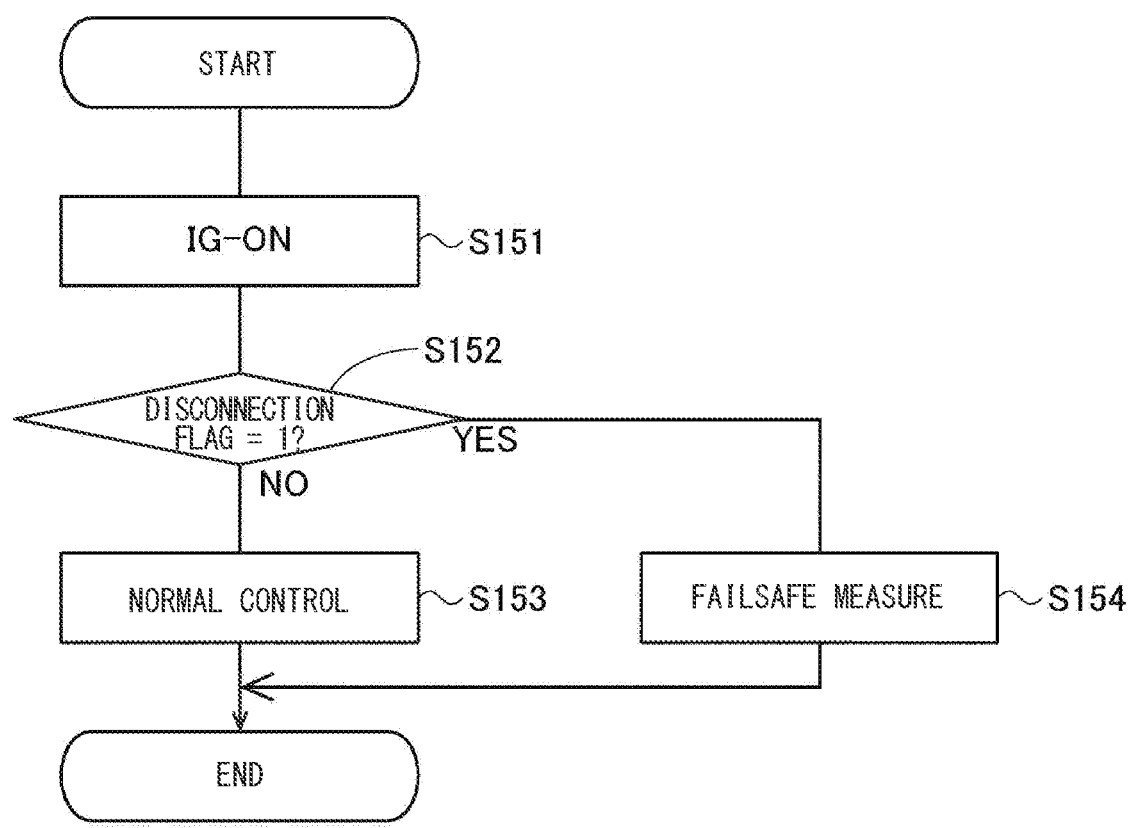
FIG. 11 is a flowchart explaining a process performed after the IG is turned on, as a process performed subsequently to the disconnection diagnosis performed after the IG is turned off according to the one embodiment.

A process performed after the IG is turned on in a case of execution of the disconnection diagnosis process after turning off of the IG will be described with reference to a flowchart of FIG. 11. When the IG is turned on in S151, the abnormality monitoring section 53 in S152 determines whether or not the disconnection flag has been set. When it is determined that the disconnection flag has not been set (S152: NO), the process proceeds to S153. When it is determined that the disconnection flag has been set (S152: YES), the process proceeds to S154.

In S153, the controller 50 energizes the winding sets 11 and 12 to drive the motor 10 using the two systems.

In S154, the controller 50 performs a failsafe measure. In the present embodiment, the motor 10 is driven using the system where the disconnection abnormality has not occurred. In this case, the relay unit 91 or 92 of the system where the abnormality has occurred is turned off. In the present embodiment, the relay unit 91 or 92 of the system where the disconnection abnormality has occurred is turned off in view of safety. However, the motor 10 can be driven only by the normal system even when both the relay units 91 and 92 are turned on. Moreover, a warning lamp indicating the presence of the disconnection abnormality is lit to warn a user that the abnormality has occurred in the shift-by-wire system 1. The method for warning the user is not limited to the lighting of the warning light, but may be any methods such as voice guidance.

Figure 12:
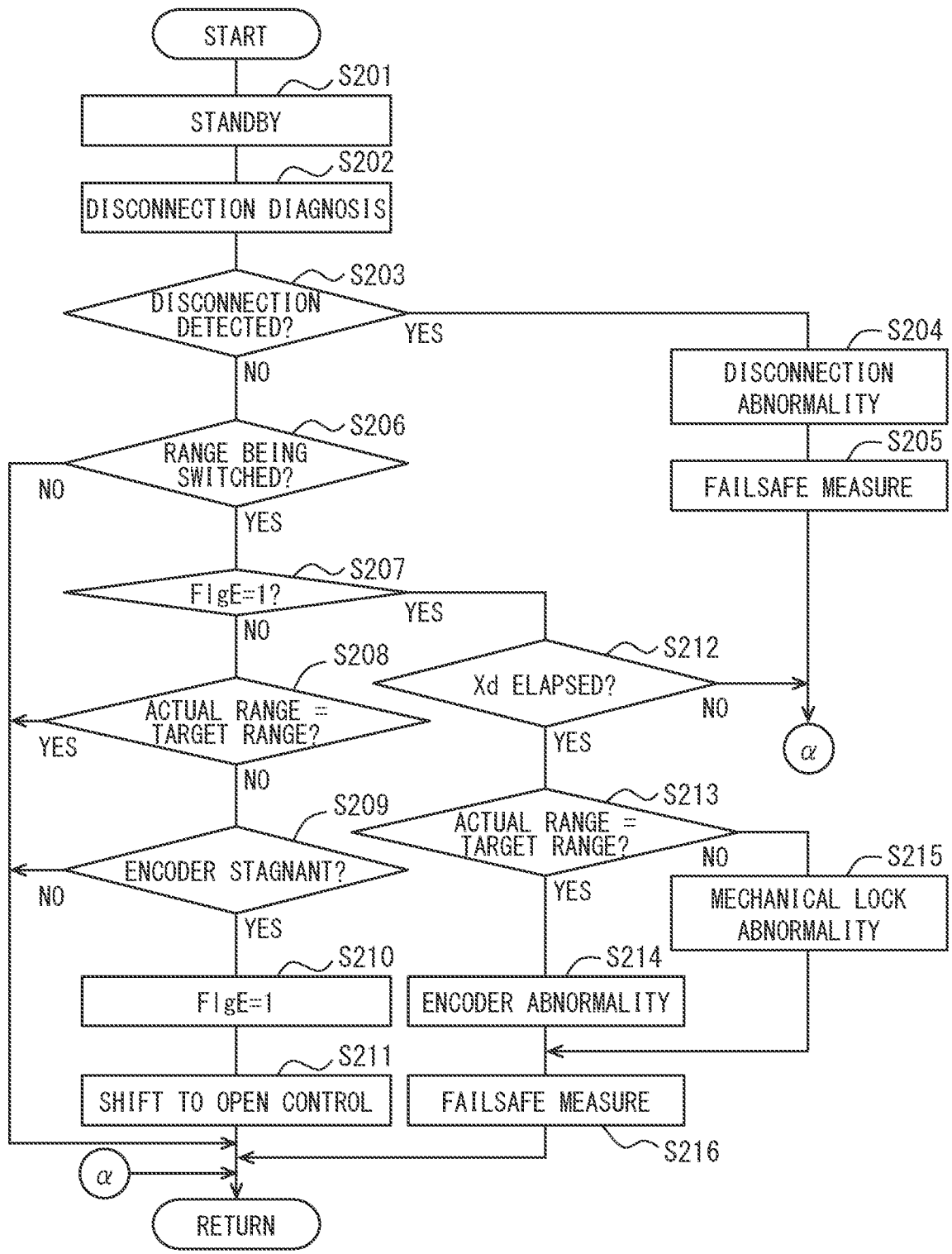
FIG. 12 is a flowchart explaining a disconnection diagnosis process performed in an IG on-state according to the one embodiment.

The disconnection diagnosis process performed in the on-state of the IG will be described with reference to a flowchart of FIG. 12. This processing may be executed at any timing while the IG is in the on state. In the present embodiment, a standby state is produced when a microcomputer is initialized after turning-on of the IG.

When the process proceeds from the standby state in S201 to S202, the disconnection diagnosis is executed. In S203, the abnormality monitoring section 53 determines whether or not a disconnection abnormality has been detected. When it is determined that a disconnection abnormality has been detected (S203: YES), the process proceeds to S204. In this case, the abnormality monitoring section 53 specifies that the abnormality having occurred is a disconnection abnormality. In S205, the controller 50 performs a failsafe measure similar to that in S154 in FIG. 11. When it is determined that the disconnection abnormality has not been detected (S203: NO), the process proceeds to S206.

In S206, the abnormality monitoring section 53 determines whether or not the current state is a shift range switching state where the shift range is being switched. When it is determined that the current state is not the shift range switching state (S206: NO), this routine ends. When it is determined that the current state is the shift range switching state (S206: YES), the process proceeds to S207.

In S207, the abnormality monitoring section 53 determines whether or not an encoder temporary abnormality flag has been set. In the figure, the encoder temporary abnormality flag is indicated as "FIgE". When it is determined that the encoder temporary abnormality flag has been set (S207: YES), the process proceeds to S212. When it is determined that the encoder temporary abnormality flag has not been set (S207: NO), the process proceeds to S208.

In S208, the abnormality monitoring section 53 determines whether or not the actual range matches the target shift range. When it is determined that the actual range matches the target shift range (S208: YES), this routine ends based on completion of the shift range switching. When it is determined that the actual range does not match the target shift range (S208: NO), the process proceeds to S209.

In S209, the abnormality monitoring section 53 determines whether or not a count value of the encoder 13 is stagnant. It is determined herein that the encoder count value is stagnant when the encoder count value does not change for a stagnation determination time or longer. When it is determined that the encoder count value is not stagnant (S209: NO), this routine ends. When it is determined that the encoder count value is stagnant (S209: YES), the process proceeds to S210 to set the encoder temporary abnormality flag. In S211, the controller 50 switches a drive mode of the motor 10 to an open control mode which does not use a detection value of the encoder 13.

When it is determined that the encoder temporary abnormality flag has been set (S207: YES), the process proceeds to S212, where the abnormality monitoring section 53 determines whether or not a switching completion determination time Xd has elapsed since the shift to the open control mode. The switching completion determination time Xd is set to a time longer than a time required to switch the shift range when the motor 10 is driven by open driving. When it is determined that the switching completion determination time Xd has not elapsed (S212: NO), the open control is continued with an end of this routine. When it is determined that the switching completion determination time Xd has elapsed (S212: YES), the process proceeds to S213.

In S213, the abnormality monitoring section 53 determines whether or not the actual range matches the target shift range based on a detection value of the output shaft sensor 16. When it is determined that the actual range matches the target shift range (S213: YES), the process proceeds to S214 to confirm an encoder abnormality. When it is determined that the actual range does not match the target shift range (S213: NO), the process proceeds to S215 to confirm a mechanical lock abnormality. In S216, the controller 50 performs a failsafe measure in accordance with the abnormal situation.

Figure 13:
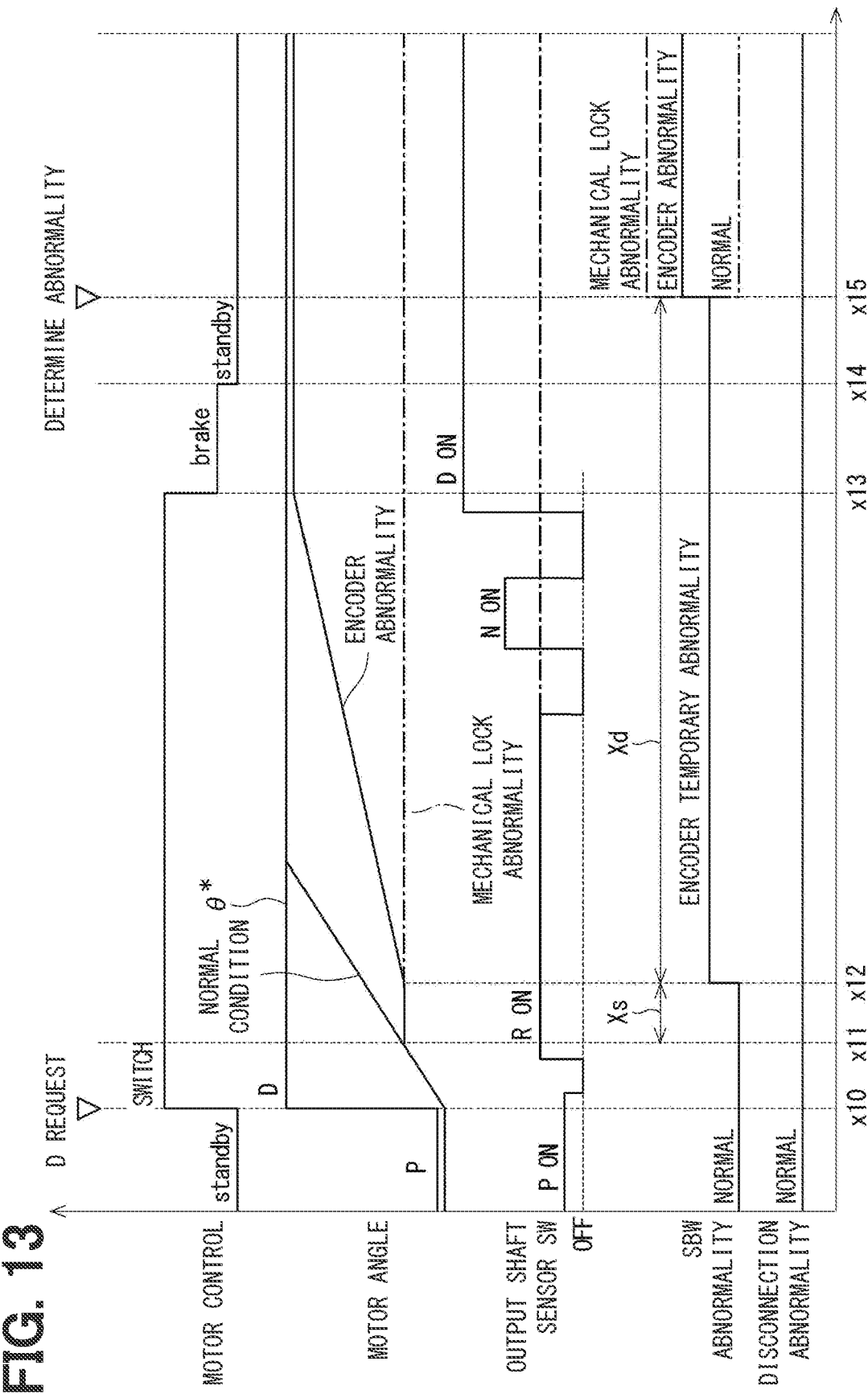
FIG. 13 is a time chart explaining an abnormality determination process at the time of range switching according to the one embodiment.

An abnormality determination process performed at the time of range switching will be described with reference to a time chart of FIG. 13. FIG. 13 shows, from the upper side, a motor control, a motor angle, a switch on-off signal of the output shaft sensor 16, an abnormality determination state of the shift-by-wire system 1, and disconnection detection. FIG. 13 does not show the on-off signal of the output shaft sensor 16 in the normal condition.

When the target shift range switches from the P range to the D range at a time x10, a target rotation position θ* corresponding to the range is established. In this case, driving of the motor 10 is started by feedback control or the like based on a detection value of the encoder 13. With the start of driving of the motor 10, the motor angle approaches the target rotation position θ* in the normal condition. Moreover, a switch constituting the output shaft sensor 16 is switched on or off in accordance with rotation of the motor 10.

When the value of the encoder 13 becomes stagnant at a time x11, the abnormality monitoring section 53 determines an encoder temporary abnormality at a time x12 after an elapse of a stagnation determination time Xs since the start of the stagnation. When the encoder temporary abnormality is determined, the control of the motor 10 is switched to such a control which does not use a detection value of the encoder 13, such as open drive control which switches the energized phase at a predetermined time interval.

When the motor 10 is controlled without using the detection value of the encoder 13, it is recognized that the motor 10 is in a rotatable state based on a change of a signal from the output shaft sensor 16 as indicated by a solid line. When a switch of the output shaft sensor 16 corresponding to the D range is turned on by rotating the motor 10 under open driving, the motor 10 is brake-controlled in a period from a time x13 to a time x14 (e.g., 100 [ms]). Thereafter, the current state returns to the standby state. Furthermore, an encoder actual abnormality is confirmed at a time x15 after an elapse of the switching completion determination time Xd since the shift to open driving.

On the other hand, when the signal from the output shaft sensor 16 does not change even under control of the motor 10 without using the detection value of the encoder 13 as indicated by a one-dot chain line, it is considered that the motor 10 is not rotating. In this case, the abnormality monitoring section 53 determines that not an abnormality of the encoder 13 but an abnormality prevents rotation of the motor 10 has occurred. In FIG. 13, a mechanical lock abnormality is confirmed at the time x15 after an elapse of the switching completion determination time Xd since the shift to open driving on assumptions that the disconnection abnormality determination has been performed before the start of the shift range switching, and that no disconnection has occurred during range switching. When determination of an encoder temporary abnormality is made in the absence of the rotation of the motor 10, the disconnection diagnosis described above may be performed to specify whether the disconnection abnormality is a mechanical lock abnormality. For example, when a negative determination is made in S213 in FIG. 12, the disconnection diagnosis may be performed. Moreover, when the abnormality of the encoder 13 is temporary as indicated by a two-dot chain line, the encoder 13 may be returned to the normal condition.

As described above, the shift range control device 40 according to the present embodiment is configured to control driving of the motor 10 including the plurality of winding sets 11 and 12, to thereby control the shift-by-wire system 1, and includes the drive circuit 41, the voltage detector 43, and the controller 50. The drive circuit 41 includes the switching elements 411 to 413, and is shared by the plurality of winding sets 11 and 12. The voltage detector 43 detects the terminal voltages Vu, Vv, and Vw of the respective phases.

The controller 50 includes the energization control section 51, the relay control section 52, and the abnormality monitoring section 53. The energization control section 51 controls energization of the winding sets 11 and 12 by controlling on and off operations of the switching elements 411 to 413. The relay control section 52 controls the relay units 91 and 92 each of which is capable of switching between conduction and interruption of power from the battery 90 to corresponding one of the winding sets 11 and 12. The abnormality monitoring section 53 monitors an abnormality of the shift-by-wire system 1. The abnormality monitoring section 53 performs disconnection diagnosis based on the terminal voltages Vu, Vv, and Vw that are generated during energization of the winding sets 11 and 12 in a control state where one of the relay units is controlled to conduct the power and the other of the relay units is controlled to interrupt the power. In this manner, a disconnection abnormality is appropriately detected even when the drive circuit 41 is shared by the winding sets 11 and 12 of the plurality of systems for simplification of the configuration.

One-side ends of the windings 111 to 113 of the first winding set 11 are connected to each other at the wiring connection portion 115. One-side ends of the windings 121 to 123 of the second winding set 12 are connected to each other at the wiring connection portion 125. The other ends of the windings 111 to 113 of the first winding set 11 are correspondingly connected to the windings 121 to 123 of the second winding set 12 in the corresponding phases at the connecting portions 421 to 423. The relay units 91 and 92 are provided on the power supply lines 901 and 902 connecting the wiring connection portions 115 and 125 and the battery 90. The switching elements 411 to 413 are provided between the connecting portions 421 to 423 and the ground. In this configuration, the winding sets are independently energized by turning on the respective relay units 91 and 92 one by one, and thus a disconnection abnormality can be appropriately detected.

The winding sets 11 and 12 have the windings 111 to 113 and 121 to 123 of three phases, respectively. When the switching elements 411 to 413 of one phase or two phases are turned on in the disconnection diagnosis, and the terminal voltage Vu, Vv, Vw of an energization off phase in which the switching element is in the off state is equal to or lower than the voltage determination threshold Vth, the abnormality monitoring section 53 determines that a disconnection abnormality has occurred in the energization off phase. For example, when the switching element 411 is in the off state and the U-phase terminal voltage Vu is lower than the voltage determination threshold Vth, it is specified that a disconnection abnormality has occurred in the U-phase of the first winding set 11. In this manner, the disconnection portion can be appropriately specified.

The abnormality monitoring section 53 performs the disconnection diagnosis when the IG as the start switch of the vehicle is turned off. In this case, the shift range can be rapidly switched after the start, at the start of the next trip.

The abnormality monitoring section 53 performs the disconnection diagnosis when the shift range is not switched in the on-state of the IG. In this case, a shift to the failsafe action is rapidly achievable after detection of the abnormality.

In the presence of an abnormality that a detection value of the encoder 13 configured to detect the rotational position of the motor 10 is stagnant during the shift range switching, when the motor 10 can be driven without using the detection value of the encoder 13, the abnormality monitoring section 53 determines an abnormality of the encoder 13. When the motor 10 cannot be driven even under control for driving the motor 10 without using the detection value of the encoder 13, it is determined whether the abnormality is a disconnection abnormality or a mechanical lock abnormality other than the disconnection abnormality based on a result of the disconnection diagnosis. In this manner, the type of abnormality can be appropriately specified.

Other Embodiments

In the embodiment described above, the actuator is provided by an SR motor. In another embodiment, the actuator may be any devices capable of driving members associated with shift range switching, such as a DC brushless motor. In the embodiment described above, the winding sets and the interruption units of two systems are provided. In another embodiment, the number of systems of the winding sets and the interruption units may be three or more. In the embodiment described above, the windings of three phases are Y-connected in each winding set. In another embodiment, the winding connection method of the windings may be any connection methods, such as Δ connection. Moreover, in the embodiment described above, each of the winding sets is constituted by the windings of three phases. However, each of the winding sets may be constituted by windings of four or more phases. The rotation angle sensor of the embodiment described above is provided by an encoder. In another embodiment, the rotation angle sensor may be of any types such as a resolver, rather than an encoder.

In the embodiment described above, the rotating member is a detent plate, while the engaging member is a detent roller. In another embodiment, the rotating member and the engaging member are not limited to the detent plate and the detent roller, respectively, but may be any other members such as members having different shapes, for example. In the embodiment described above, four recesses are formed in the detent plate. In another embodiment, the number of the recesses is not limited to four, but may be any number. For example, two recesses may be formed in the detent plate to allow switching between P range and non-P range. The shift range switching mechanism, the parking lock mechanism, and the like may be different from the corresponding mechanisms of the above embodiment.

In the embodiment described above, a speed reducer is provided between the motor shaft and the output shaft. While details of the speed reducer are not mentioned in the above embodiment, the speed reducer may have any configurations, such as a configuration including a cycloid gear, a planetary gear, a gear using a spur gear which transmits torque from a speed reduction mechanism substantially coaxial with the motor shaft to a drive shaft, and a combination of these gears. In a different embodiment, the speed reducer between the motor shaft and the output shaft may be eliminated, or a mechanism other than the speed reducer may be provided. The present disclosure is not limited to the embodiments described herein. The present disclosure may be practiced in various modes in the scope without departing from the gist of the disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A shift range control device configured to control driving of an actuator including a plurality of winding sets for controlling a shift range switching system, the shift range control device comprising:
   a drive circuit that includes a plurality of switching elements, and is shared by the plurality of winding sets;
   a voltage detector that detects terminal voltages of respective phases; and
   a controller that includes
      an energization control section configured to control on and off operations of the switching elements to control energization of the winding sets,
      an interruption unit control section configured to control a plurality of interruption units each of which is capable of switching between conduction and interruption of power from a power supply to a corresponding one of the winding sets, and
      an abnormality monitoring section configured to monitor an abnormality of the shift range switching system, wherein
   the abnormality monitoring section performs a disconnection diagnosis based on the terminal voltages that are generated during energization of the winding sets in a control state where one of the interruption units is controlled to conduct the power and a remaining interruption unit is controlled to interrupt the power.

2. The shift range control device according to claim 1, wherein
   each of the winding sets includes a plurality of windings that have one ends connected to each other at a wiring connection portion and other ends connected to windings of corresponding phases of another winding set at connecting portions,
   the interruption units are provided on power supply lines connecting the wiring connection portions and the power supply, and
   the switching elements are provided between the connecting portions and a ground.

3. The shift range control device according to claim 2, wherein
   each of the winding sets includes the windings of three phases, and
   in the disconnection diagnosis, when the switching element of one of three phases or the switching elements of two of the three phases are turned on, and the terminal voltage of an energization off phase in which the switching element is turned off is equal to or lower than a voltage determination threshold, the abnormality monitoring section determines that the energization off phase has a disconnection abnormality.

4. The shift range control device according to claim 1, wherein the abnormality monitoring section performs the disconnection diagnosis when a start switch of a vehicle is turned off.

5. The shift range control device according to claim 1, wherein the abnormality monitoring section performs the disconnection diagnosis when a start switch of a vehicle is in an on state and a shift range is not being switched.

6. The shift range control device according to claim 1, wherein in a presence of an abnormality that a detection value of a rotation angle sensor, which is configured to detect a rotational position of the actuator, is stagnant while a shift range is being switched, the abnormality monitoring section determines an abnormality of the rotation angle sensor in a case where the actuator is allowed to be driven without using the detection value of the rotation angle sensor, and discriminates a disconnection abnormality or a mechanical lock abnormality other than the disconnection abnormality based on a result of the disconnection diagnosis in a case where the actuator is not allowed to be driven even under control such that the actuator is driven without using the detection value of the rotation angle sensor.

7. A shift range control device configured to control driving of an actuator including a plurality of winding sets for controlling a shift range switching system, the shift range control device comprising:

a drive circuit that includes a plurality of switching elements, and is shared by the plurality of winding sets;

a voltage detector that detects terminal voltages of respective phases of the plurality of winding sets; and a controller that (i) controls on and off operations of the switching elements to control energization of the winding sets, (ii) controls a plurality of interruption units each of which is capable of switching between conduction and interruption of power from a power supply to a corresponding one of the winding sets, and (iii) performs a disconnection diagnosis based on the terminal voltages that are generated during energization of the winding sets in a control state where one of the interruption units is controlled to conduct the power and a remaining interruption unit is controlled to interrupt the power.

* * * * *